(12) United States Patent
Williams, III

(10) Patent No.: US 6,782,452 B2
(45) Date of Patent: Aug. 24, 2004

(54) APPARATUS AND METHOD FOR PROCESSING DATA USING A MERGING CACHE LINE FILL TO ALLOW ACCESS TO CACHE ENTRIES BEFORE A LINE FILL IS COMPLETED

(75) Inventor: Gerard Richard Williams, III, Austin, TX (US)

(73) Assignee: ARM Limited, Cambridge (GB)

(*) Notice: Subject to any disclaimer, the term of this patent is extended or adjusted under 35 U.S.C. 154(b) by 374 days.

(21) Appl. No.: 10/011,310

(22) Filed: Dec. 11, 2001

(65) Prior Publication Data

US 2003/0110356 A1 Jun. 12, 2003

(51) Int. Cl.[7] .............................................. G06F 13/00
(52) U.S. Cl. ..................................... 711/133; 711/118
(58) Field of Search ................................. 711/118, 133

(56) References Cited

U.S. PATENT DOCUMENTS

| | | | | |
|---|---|---|---|---|
| 5,367,660 A | * | 11/1994 | Gat et al. ........................ | 711/3 |
| 5,671,444 A | * | 9/1997 | Akkary et al. .................. | 710/52 |
| 5,680,572 A | * | 10/1997 | Akkary et al. ................. | 711/126 |
| 5,721,867 A | * | 2/1998 | Kuttanna et al. ............ | 711/141 |
| 5,781,926 A | * | 7/1998 | Gaskins et al. .............. | 711/145 |
| 5,897,654 A | * | 4/1999 | Eisen et al. ................... | 711/131 |
| 6,339,813 B1 | * | 1/2002 | Smith et al. ................... | 711/144 |

* cited by examiner

*Primary Examiner*—Glenn Gossage
(74) *Attorney, Agent, or Firm*—Nixon & Vanderhye P.C.

(57) ABSTRACT

A data processing system includes a processor core, a cache memory and a cache controller which operate to allow data accesses to a cache line for which a pending cache linefill operation exists to be serviced for those data words within the cache line that are valid at a particular point in time. One or more status bits are provided in association with each cache line indicating whether a line fill is pending for that cache line. The old data may be manipulated up to the point where the first new data is returned. New data items may be read once they have been written into a victim cache line even though the cache linefill is not completed. Stores to the victim cache line may be made via a fill buffer even though the linefill is still pending. The cache memory may include a content addressable memory (CAM) and the cache memory and controller may support a hit under miss operation.

14 Claims, 5 Drawing Sheets

APPARATUS AND METHOD FOR PROCESSING DATA USING A MERGING CACHE LINE FILL TO ALLOW ACCESS TO CACHE ENTRIES BEFORE A LINE FILL IS COMPLETED

BACKGROUND OF THE INVENTION

1. Field of the Invention

This invention relates to the field of data processing systems. More particularly, this invention relates to data processing systems incorporating a cache memory and for which data processing operations continue, where possible, when a cache miss occurs.

2. Description of the Prior Art

It is known to provide data processing systems having cache memories in order to increase the processing performance of such systems. Cache memories provide a relatively small amount of high speed memory compared with the main memory, such as Random Access Memory (RAM) or disk storage, that provides a comparatively large amount of low speed storage. Whilst efforts are made to provide within the cache memory a copy of the data desired from the main memory, inevitably data access requests occur to data items not currently stored within the cache memory. In such circumstances, a cache "miss" is triggered, and typically a linefill operation is performed. A linefill operation selects a victim cache line containing multiple data items from within the cache memory and replaces those data items with data items from a block of memory addresses including the desired data item that gave rise to the cache miss.

In known cache memory systems, such as the Advanced RISC Machines (ARM) ARM920 processor produced by ARM Limited, Cambridge, England, when a cache miss occurs, then the victim cache line is marked as invalid throughout the subsequent linefill operation until the linefill is completed and the new cache line is again marked as valid.

It is an object of the present invention to provide greater processing performance within a data processing system including a processor core and a cache memory.

SUMMARY OF THE INVENTION

Viewed from one aspect, the present invention provides an apparatus for processing data, comprising:
 a processor core operable to generate a data access request to a target data item having a target memory address;
 a cache memory having a plurality of cache lines, each cache line storing a plurality of data items associated with an address value, the cache memory being operable such that:
  (i) if the target data item is stored within the cache memory, then said the cache memory is operable to service the data access request; or
  (ii) if the target data item is not stored within the cache memory, then the cache memory triggers a cache line fill operation whereby a plurality of new data items including said target data item are fetched from a main memory and written into a victim cache line among the plurality of cache lines replacing any old data items previously stored in the victim cache line; and
 a cache controller responsive to one or more status bits associated with the victim cache line to be operable during a cache line fill operation to permit data access requests to those data items stored within the victim cache line associated with a current address value for the victim cache line.

The inventor recognized that during a linefill operation, it is possible to continue using the old data items for some time and also use new data items from a partially completed linefill even though the linefill operation is still pending. Given the relatively long delay incurred by a linefill operation due to the relatively slow access that is possible to the main memory, the processor core and cache memory may be capable of performing a considerable amount of useful processing activity during the linefill operation. The inventor recognized that this processing activity can be extended to include accesses to the victim cache line. As an example, until the first of the new data starts to be returned from the main memory, the old data in the cache line may continue to be made available to the processor core should subsequent data processing operations require that data and there not be any intervening dependency upon the operations that have missed that prevents the subsequent data processing operation from being performed. Thus, the old data in the victim cache line is preferably made available for continued use until its replacement within the cache actually starts.

In a similar manner, as the new data items are streamed back from the main memory, they are written into the victim cache line. It may be that subsequent data processing operations can make use of those data items to carry out useful processing tasks even before the cache linefill has completed.

This ability to continue to work with data items that are subject to a pending cache linefill is further enhanced in embodiments that provide a fill buffer that may be associated with the victim cache line and into which new data values that are intended to overwrite the data values to be read from the main memory may be written even though the data items from the cache miss have not yet been returned.

While it would be possible to associate a plurality of status bits with each cache line indicating the progress through a linefill for that individual cache line, circuit area is saved when each cache line is associated with a cache line status bit that serves to indicate that a linefill is pending for that cache line without in itself giving information about the progress of that particular linefill.

In circumstances in which only a single pending linefill is allowed at any given time, a single set of data item status bits may be provided for the cache memory and serve to indicate the progress through the pending linefill operation with the cache line concerned being identified through another bit.

The bus requirements for storing out dirty cache data can be reduced in preferred embodiments in which the dirty data items are separately removed from the victim cache line as they are replaced by their respective new data items.

In embodiments having both a set of data item status bits and a cache line status bit, preferred embodiments act to first check whether a cache line status bit is set indicating a pending linefill operation and then reference is made to the data item status bits to determine the state of progress of that linefill operation in order to grant or deny permission to a particular data access request being made to the cache memory.

It will be appreciated that the principle of the present invention could be applied to many different types of cache architecture. In particular, the invention is equally applicable to content addressable memory architectures and tag RAM architectures.

In the case of a content addressable memory architecture, it is convenient to include the cache line status bits within the content addressable memory as then the check for a pending linefill operation can be combined with the address matching operation normally performed and provided for as part of the content addressable memory operation.

The invention is particularly well suited for use in systems that provide hit-under-miss operation for their caches and also critical data first linefill operations.

Viewed from another aspect, the present invention provides a method of processing data, the method comprises:

generating a data access request to a target data item having a target memory address;

storing data items in a cache memory having a plurality of cache lines, each cache line storing a plurality data items associated with an address value, the cache memory being operable such that:

(i) if the target data item is stored within the cache memory, then the cache memory is operable to service the data access request; or (ii) if the target data item is not stored within the cache memory, then the cache memory triggers a cache line fill operation whereby a plurality of new data items including the target data item are fetched from a main memory and written into a victim cache line among the plurality of cache lines replacing any old data items previously stored in the victim cache line; and in response to one or more status bits associated with the victim cache line, permitting during a cache line fill operation data access requests to those data items stored within said victim cache line associated with a current address value for the victim cache line.

The above, and other objects, features and advantages of this invention will be apparent from the following detailed description of illustrative embodiments which description is to be read in connection with the accompanying drawings.

DESCRIPTION OF THE PREFERRED EMBODIMENTS

Figure 1:
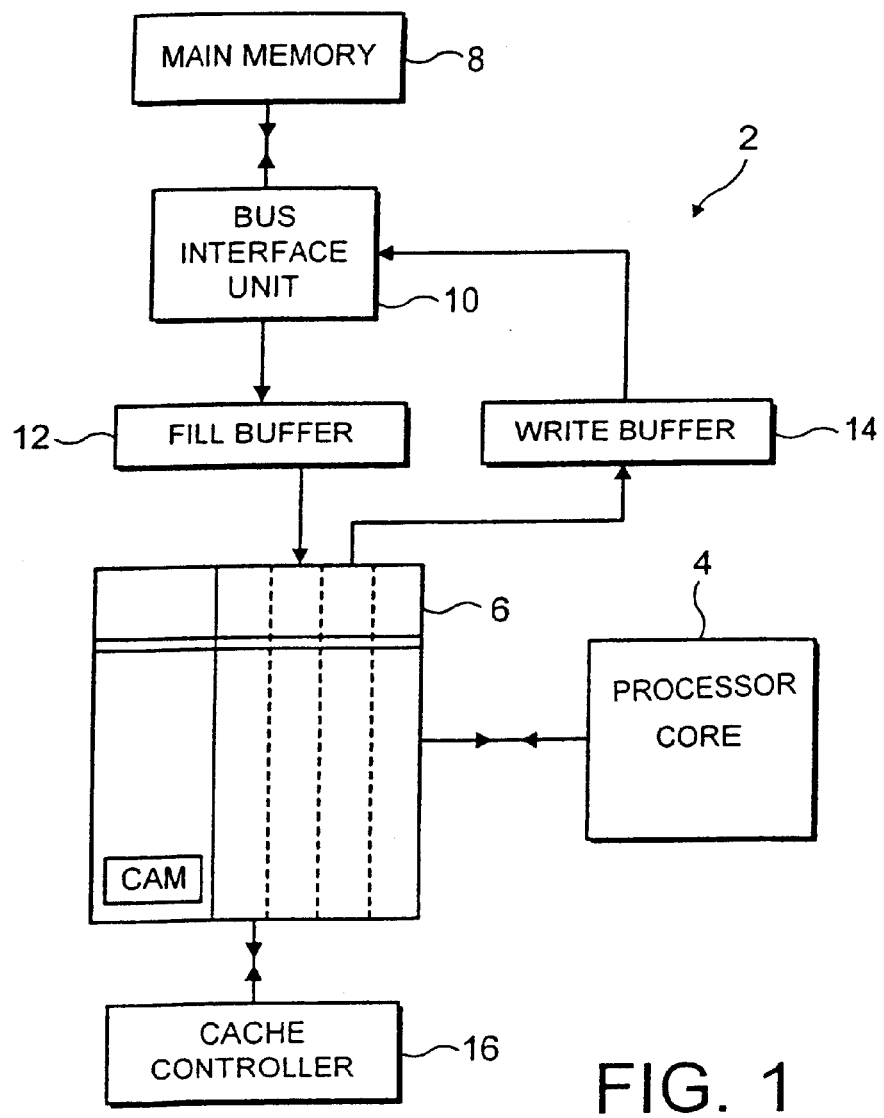
FIG. 1 schematically illustrates a data processing system including a cache memory and a processor core.

FIG. 1 schematically illustrates a data processing system 2 including a processor core 4 and a cache memory 6. The cache memory 6 is connected to a main memory 8, which could be a random access memory, a hard disk drive or some other form of bulk storage, via a bus interface unit 10 and a fill buffer 12. A write buffer 14 is also provided between the cache memory 6 and the bus interface unit 10. A cache controller 16 serves to manage the operation of the cache memory, such as providing victim selection for the cache lines upon a miss, control of linefill, control of cache streaming and control of access to data within a cache line that is subject to a pending linefill operation in accordance with the techniques discussed above.

In operation, the processor core 4 executes data processing instructions that may include loads from memory locations and stores to memory locations. If the cache memory system is efficiently designed and utilized, then the vast majority of these data accesses may be serviced by data held within the cache memory 6. However, inevitably some data access misses will occur when a data access is requested to a data item that is not stored within the cache memory 6. In such circumstances, the cache controller 16 serves to initiate a linefill operation by selecting a victim cache line that is to be replaced and retrieving data to fill that victim cache line from the main memory 8, that retrieved data including the data item that gave rise to the miss. Victim selection, linefill control and cache streaming are in themselves known techniques within the field and will not be described further herein.

If the cache data to be replaced has been altered while it was stored within the cache memory 6 compared to the copy of that data in the main memory 8, then that data is termed "dirty" and needs to be written back to the main memory 8 in order to preserve integrity and ensure proper operation. This "dirty" data may be stored out to a write buffer 14 for writing back to the main memory 8 when time allows. It is generally more efficient to service the data access that gave rise to the miss before completing any write back of "dirty" data, and the write buffer allows this capability.

Figure 2:
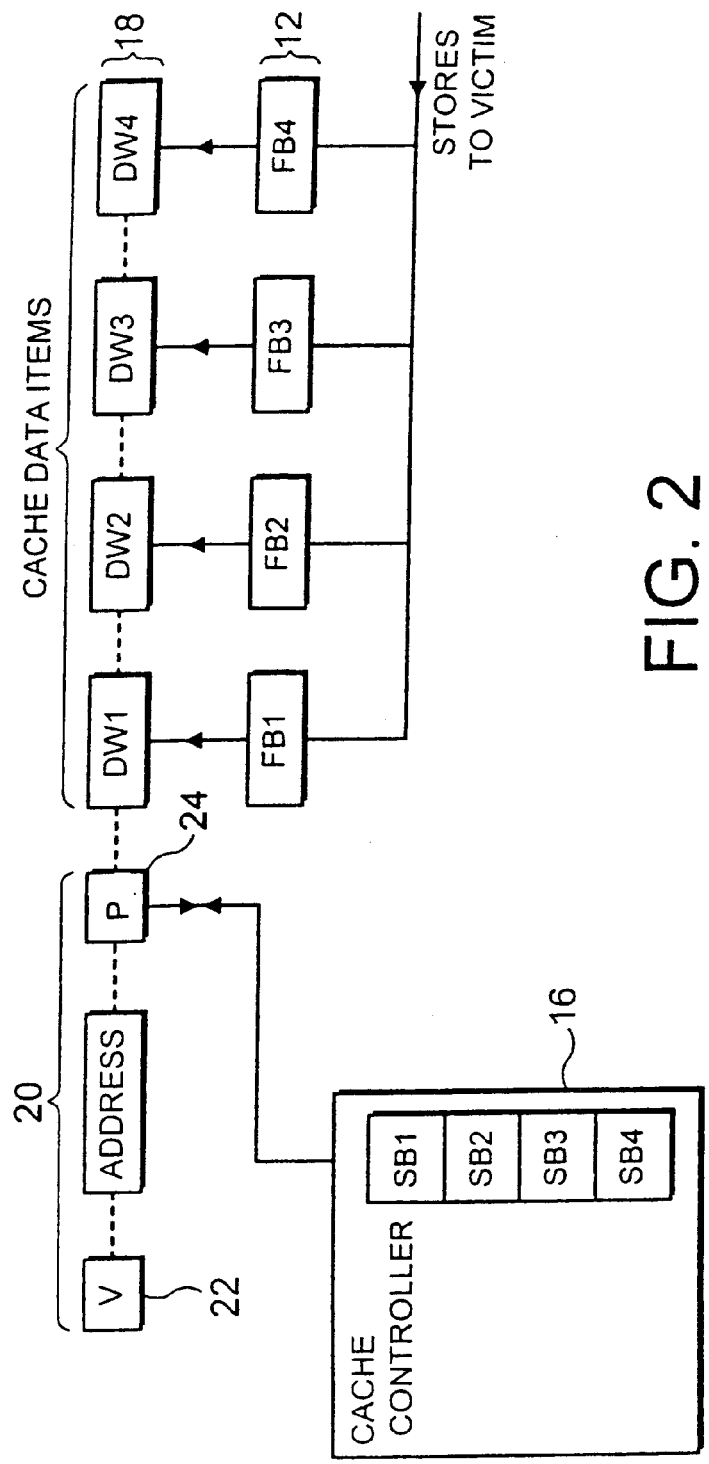
FIG. 2 schematically illustrates a cache controller and a victim cache line with its associated status bits and fill buffer.

FIG. 2 schematically illustrates a victim cache line 18 and its interaction with other parts of the system. In this example, the victim cache line 18 includes four data words DW1, DW2, DW3 and DW4 that are sequentially recovered from the main memory 8 during a linefill operation. The particular data word that gave rise to the miss is recovered first and streamed in parallel to the processor core 4 as it is returned and written into the cache 6 so that the processor core 4 may resume operation as quickly as possible. Subsequent data words are retrieved in sequence with a wrap being performed as necessary.

The victim cache line 18 includes a content addressable memory portion 20. For each cache line within the cache memory 6, the content addressable memory 20 stores address data that depends upon the size and associativity of the cache memory 8 in the normal way. Together with the address data, there is also stored a valid bit 22 and a cache line status bit 24. The valid bit 22 serves to indicate whether or not the cache line concerned stores valid data, e.g. has been initialized after system start-up. The use of a valid bit for a cache line is known in the field. The cache line status bit 24 provides the function of indicating whether or not a pending linefill operation exists for the cache line concerned. This bit is set to a "1" at the time that the first new data word is written into the victim cache line 18 and remains as a "1" until the final new data item has been written into the victim cache line 18, after which the value is returned to a 0 to indicate that the linefill operation has completed.

The cache controller 16 includes a 4-bit register including data items status bits with one data item status bit corresponding to each of the data words. These status bits are set by the cache controller 16 and referenced by the cache controller 16 to record and monitor the progress of a partially completed pending linefill operation.

In operation, when a data access request is received from the processor core 4, the memory address associated with that request is compared with the value stored in the CAM portion 20 of the cache memory 6 for each of the cache lines. If one of the cache lines gives a match, then the cache line status bit 24 for that cache line is examined to see if a pending linefill operation is in place for that cache line. The cache line status bit 24 will only be set once the first new data value has been written into the victim cache line 18. Accordingly, should the first new data value not yet have been returned, then the victim cache line 18 will be treated as if it did not have a pending linefill operation for it and the data access request concerned will be serviced in the normal way. If the cache line status bit 24 was set and that data access request is a read (since the hit occurred the read must be to the new data), then the cache controller 16 makes reference to the data item status bits it stores itself to determine whether or not the particular data item to which the data access read relates has yet been written into the victim cache line 18. If the new data item is present, then the read is allowed even though the rest of the linefill operation is still pending. If the new data item is not in place, then the access request will stall.

The fill buffer 12 provides the capability to service write requests to the data words of the victim cache line 18 even whilst the linefill for that cache line may be pending. A data word for a data access write request will be stored into the respective portion of the fill buffer 12 prior to being written into the corresponding data word of the victim cache line 18 after that data word has been returned.

Figure 3A:
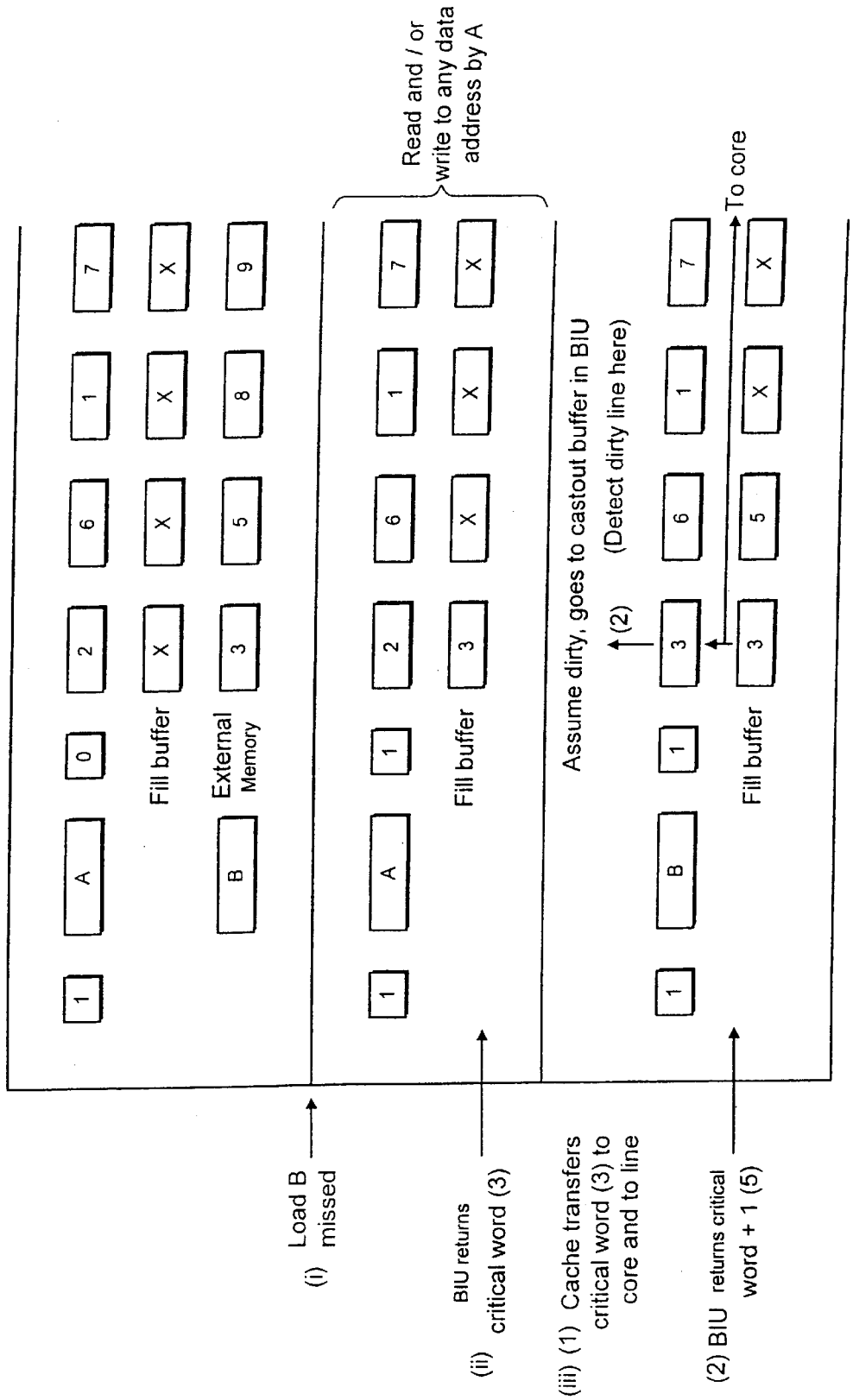
FIGS. 3A and 3B show an example sequence of operations illustrating a linefill operation in accordance with the present techniques.
Figure 3B:
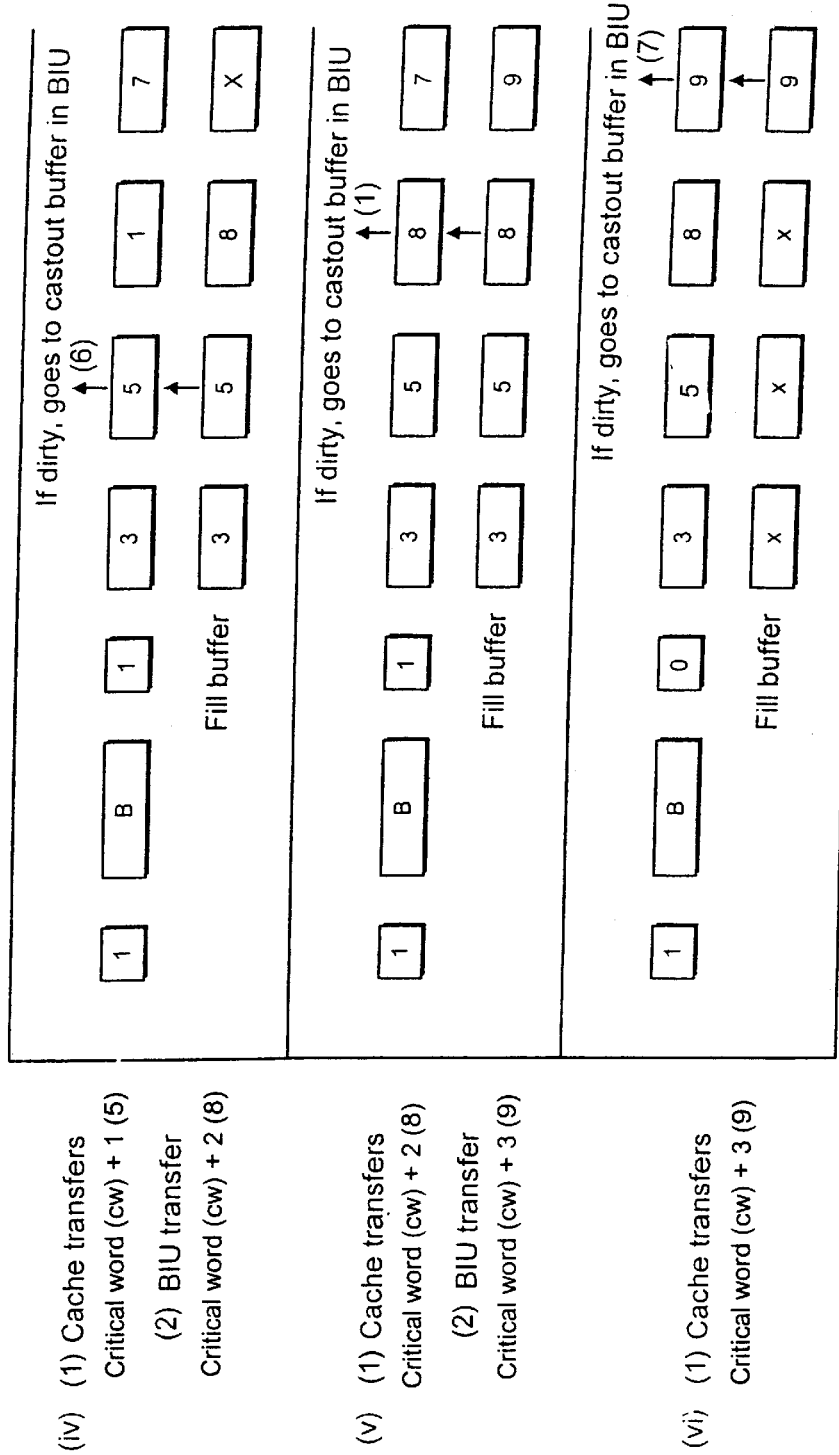

FIGS. 3A and 3B illustrate an example of a linefill operation. At the first stage as shown in FIG. 3A, the cache line illustrated contains valid data from address A with no pending linefill. The data concerned is data values 2, 6, 1 and 7. The fill buffer does not contain any required information at this stage. At this initial time, the external memory at address location B stores data values 3, 5, 8 and 9.

At time (i), the processor core 4 issues a load request to address B that misses in the cache memory 6. This initiates a cache linefill operation with the victim cache line being the one illustrated storing the data values from memory address A.

At time (ii), the bus interface unit 10 returns the first data word of the linefill (critical word (cw) first), namely data value 3. This data value is stored into the fill buffer 12.

At time (iii), the address value for the victim cache line is updated to B, the cache line status bit is set to "1" and the first returned new data value 3 is written into the first location within the victim cache line 18. It will be appreciated that between times (i) and (iii), data access requests to the old data within the victim cache line may be serviced normally since the CAM still contains the old address data value A and the cache line still contains the corresponding data words. Also at time (iii), the second data word arrives back from the main memory 8 via the bus interface unit and is stored into the second position within the fill buffer. This second data word in this example is 5.

At time (iv) as shown in FIG. 3B, the second data word is transferred from the fill buffer 12 to the victim cache line and the third data word is recovered from the main memory and stored into the fill buffer 12. Between times (iii) and (iv), any data access read request made to the first data word 3 may be serviced since the correct memory address is present within the CAM and the correct data value is present within the victim cache line 18. The ability to service this request is indicated by the setline status bit 24 and the first of the data item status bits within the cache controller 16 being set.

At time (v), the third data word 8 is transferred from the fill buffer into the victim cache and the fourth data word returned from the main memory 8 via the bus interface unit 10. Between times (iv) and (v), both the first data word 3 and the second data word 5 may be subject to read or write requests that will be serviced even though the linefill is pending.

At time (vi), the final data word 9 is transferred from the fill buffer into the victim cache line. Between times (v) and (vi), the first three data words namely 3, 5 and 8 may be subject to read requests that will be serviced if these occur.

At time (iii), the first data word is being written into the victim cache line 18 overwriting the old data word 2. At this time, the victim cache line 18 is assumed to be dirty and the old data word is written out to the write buffer 14 under control of the bus interface unit 10. At the same time, a detection is made as to whether or not the victim cache line 18 is truly dirty. If the victim cache line 18 was not dirty, then the write back request may be suppressed for the first data value. As each subsequent data value within the victim cache line 18 is replaced by its new data value, the old data value, if dirty, is written out to be returned to the main memory 8.

Figure 4:
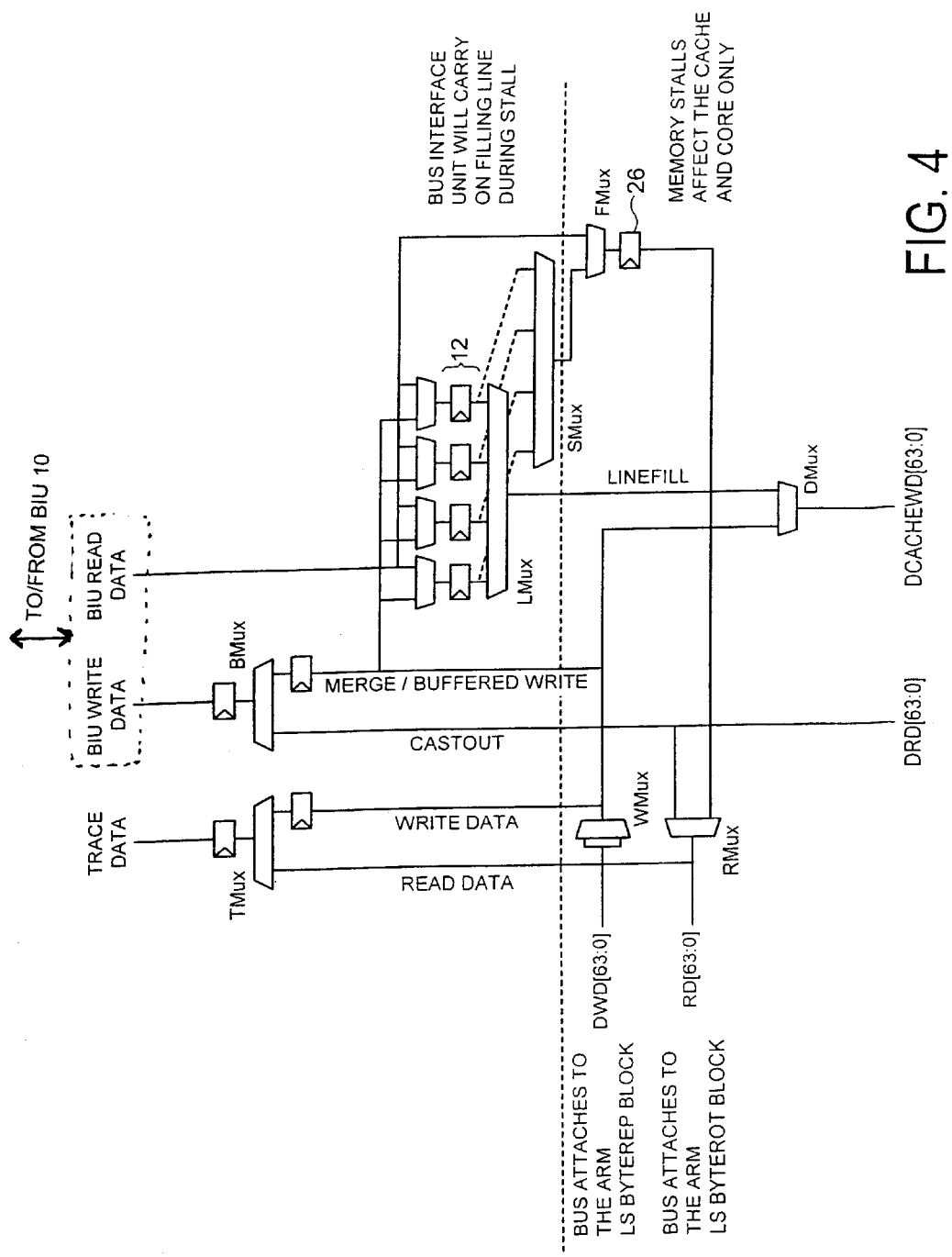
FIG. 4 is a circuit diagram illustrating a fill buffer and its associated connections with a bus interface unit, a cache and a processor core.

FIG. 4 schematically illustrates the various interconnections between the fill buffer 12, the bus interface unit 10, the processor core 4 and the cache memory 6. As will be seen, the fill buffer 12 is connected such that it can receive stores to data words that may be selected by the illustrated multiplexers and latched within the appropriate latch portion of the fill buffer 12 whilst a linefill request is pending for a victim cache line 18. The latch 26 provides a storage location for a data value that is to be returned from the main memory 8 and is required to service an instruction previously issued by the processor core 4 even though subsequent store instructions may have overwritten its position within the fill buffer 12.

The example illustrated shows a cache memory employing a content addressable memory architecture. It will be appreciated that the technique of the present invention would be equally applicable to a TAG RAM cache architecture and the modification of the technique described herein to that architecture will be apparent to those skilled in the art.

It will also be appreciated that the embodiment providing a single cache line status bit for each cache line with shared data item status bits within the cache controller 16 is a useful way of reducing circuit area requirements in systems where only a single cache linefill may be pending at any given time. If multiple cache linefills may be pending at any given time, then individual data item status bits may be provided for each cache line in order to track the progress of a cache linefill for each cache line. If individual data item status bits are provided for a cache line, then the cache line status bit may itself be omitted as it would then be redundant.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data, said apparatus comprising:
    a processor core operable to generate a data access request to a target data item having a target memory address;
    a cache memory having a plurality of cache lines, each cache line storing a plurality of data items associated with an address value, said cache memory being operable such that:
        (i) if said target data item is stored within said cache memory, then said cache memory is operable to service said data access request; and (ii) if said target data item is not stored within said cache memory, then said cache memory triggers a cache line fill operation whereby a plurality of new data items including said target data item are fetched from a main memory and written into a victim cache line among said plurality of cache lines replacing any old data items previously stored in said victim cache line; and a cache controller responsive to one or more status bits associated with said victim cache line to be operable during a cache line fill operation to permit data access requests to those data items stored within said victim cache line associated with a current address value for said victim cache line, wherein said one or more status bits include at least one cache line status bit for each cache line indicating whether a line fill operation is pending for that cache line.

2. Apparatus as claimed in claim 1, further comprising a fill buffer associated with said victim cache line, said cache controller permitting write requests via said fill buffer to new data items within said victim cache line throughout said line fill operation.

3. Apparatus as claimed in claim 1, wherein said one or more status bits include a set of data item status bits for said cache memory indicating which new data items associated with a line fill operation have been written to said victim cache line.

4. Apparatus as claimed in claim 1, wherein old data items are separately removed from said victim cache line as they are replaced by respective new data items.

5. Apparatus as claimed in claim 1, wherein said one or more status bits include a set of data item status bits for said cache memory indicating which new data items associated with a line fill operation have been written to said victim cache line and said cache controller is operable upon a data access read request to a cache line to check if a corresponding cache line status bit indicates a pending line fill for said cache line and, if so, then to check a corresponding set of data item status bits to determine if a data item being requested has yet been written to said cache line.

6. Apparatus as claimed in claim 1, wherein said cache memory includes a content addressable memory storing address values associated with said plurality of cache lines.

7. Apparatus as claimed in claim 1, wherein said cache memory includes a content addressable memory storing address values associated with said plurality of cache lines and said at least one cache line status bit for each cache line is also stored within said content addressable memory and associated with address data for that cache line.

8. Apparatus as claimed in claim 1, wherein said cache memory and said cache controller support a hit under miss operation.

9. Apparatus as claimed in claim 1, wherein a first new data item is written to said victim cache line is as said target data item, said target data item being provided in parallel to said processor core.

10. Apparatus as claimed in claim 1, wherein until a first new data item is written to said victim cache line, said cache controller permits data access requests to all of said old data items stored in said victim cache line.

11. Apparatus as claimed in claim 10, wherein a new address value is associated with said victim cache line and becomes said current address value when said first new data item is written to said victim cache line.

12. Apparatus as claimed in claim 1, wherein after a first new data item is written to said victim line, said cache controller permits data access read requests to those new data items that have been written to said victim cache line.

13. Apparatus as claimed in claim 12, wherein a new address value is associated with said victim cache line and becomes said current address value when said first new data item is written to said victim cache line.

14. A method of processing data, comprising:

generating a data access request to a target data item having a target memory address;

storing data items in a cache memory having a plurality of cache lines, each cache line storing a plurality of data items associated with an address value, said cache memory being operable such that:

(i) if said target data item is stored within said cache memory, then said cache memory is operable to service said data access request; and (ii) if said target data item is not stored within said cache memory, then said cache memory triggers a cache line fill operation whereby a plurality of new data items including said target data item are fetched from a main memory and written into a victim cache line among said plurality of cache lines replacing any old data items previously stored in said victim cache line; and in response to one or more status bits associated with said victim cache line, permitting during a cache line fill operation data access requests to those data items stored within said victim cache line associated with a current address value for said victim cache line, wherein said one or more status bits include at least one cache line status bit for each cache line indicating whether a line fill operation is pending for that cache line.

* * * * *